May 23, 1967 E. M. GLISTA 3,320,741
ELECTRONIC FUEL CONTROL SYSTEM FOR GAS TURBINE ENGINES
Filed Aug. 29, 1963 2 Sheets-Sheet 1
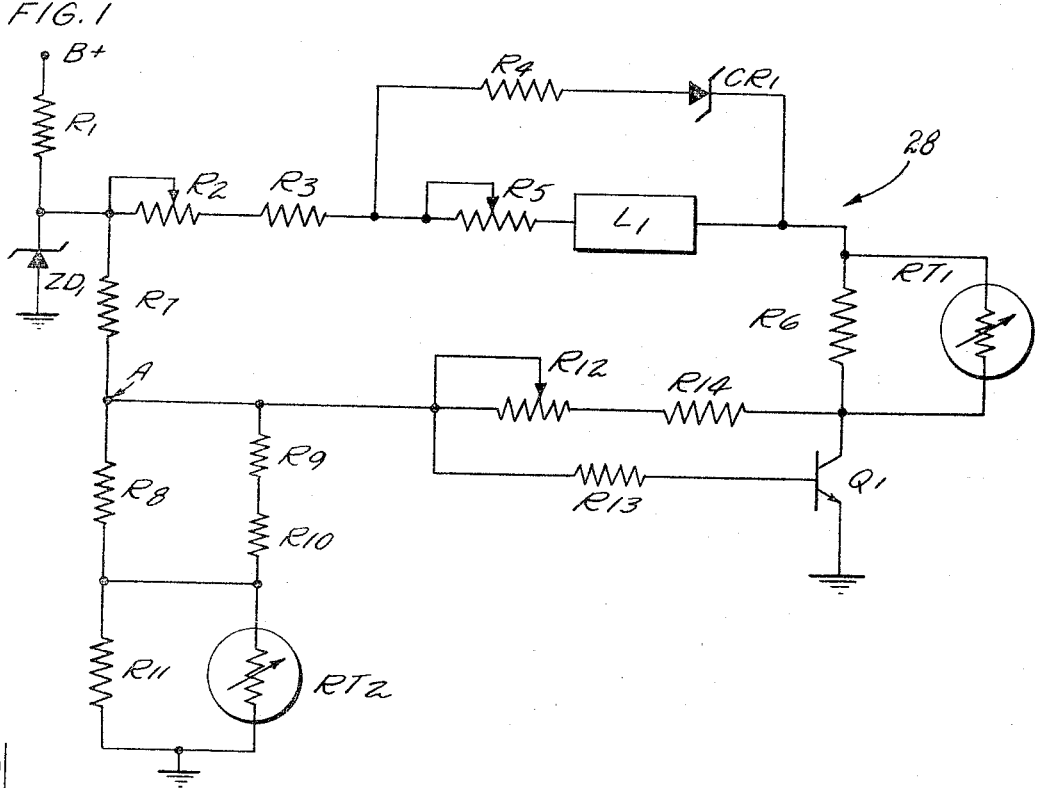
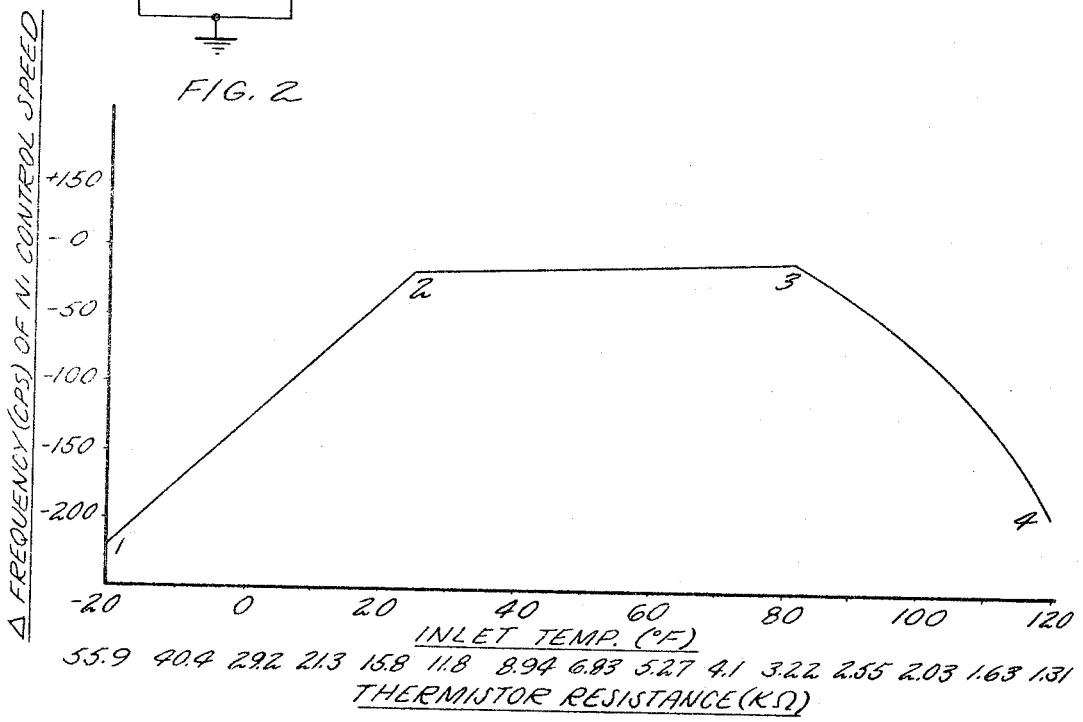
INVENTOR
EDWARD M. GLISTA
BY Donald J. Bradley
AGENT May 23, 1967  E. M. GLISTA  3,320,741
ELECTRONIC FUEL CONTROL SYSTEM FOR GAS TURBINE ENGINES
Filed Aug. 29, 1963  2 Sheets-Sheet 2
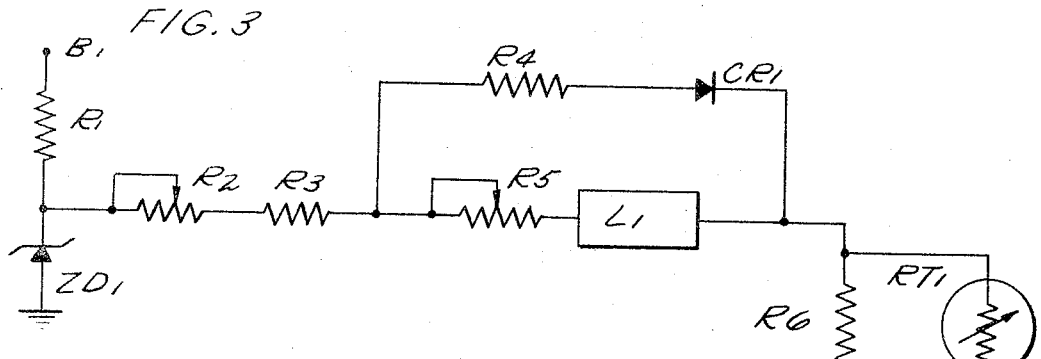
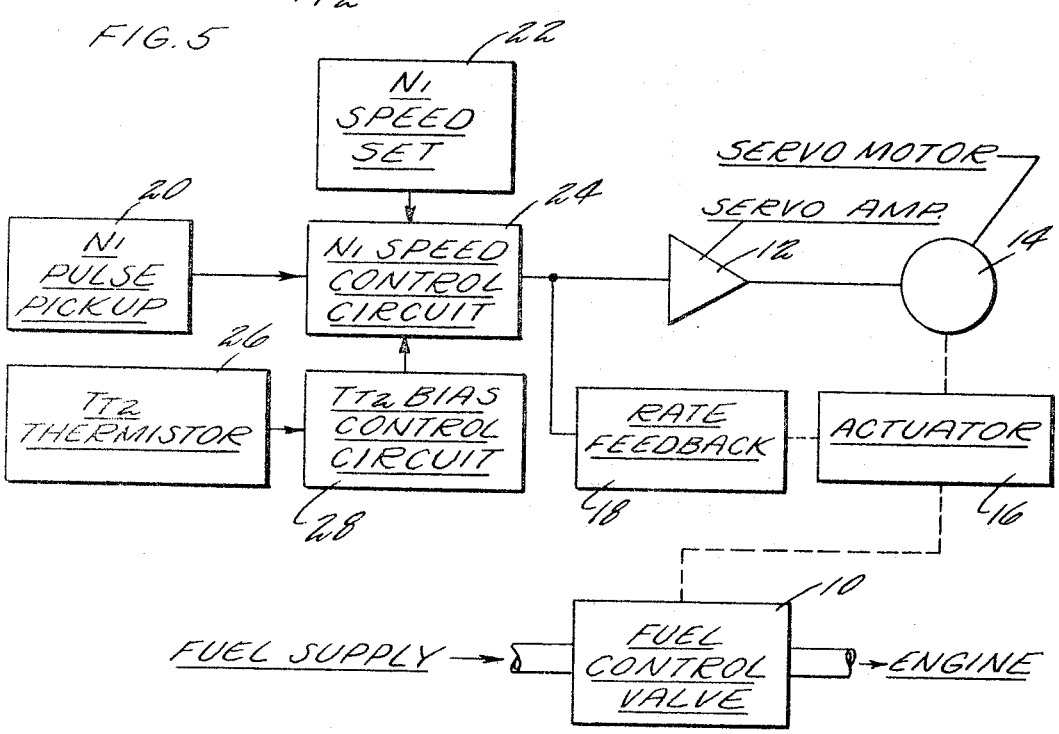
INVENTOR
EDWARD M. GLISTA
BY Donald J. Bradley
AGENT

United States Patent Office 3,320,741
Patented May 23, 1967

3,320,741
ELECTRONIC FUEL CONTROL SYSTEM FOR
GAS TURBINE ENGINES
Edward M. Glista, East Longmeadow, Mass., assignor to
United Aircraft Corporation, East Hartford, Conn., a
corporation of Delaware
Filed Aug. 29, 1963, Ser. No. 305,298
11 Claims. (Cl. 60—39.28)

This invention relates to an electronic fuel control for gas turbine engines, and particularly to an electronic circuit which regulates the fuel flow to the engine in response to a preselected schedule.

In a fuel control for gas turbine engines, it is desired to regulate the flow of fuel to the engine to thereby control the speed of the engine, or to control the power output of the engine. However, since the power output delivered by an engine will vary with outside conditions such as the temperature and pressure of the ambient air, the pressure drop across the turbine, and the temperature of the combustion chamber, the power actually delivered by the engine must be controlled as a function of these other parameters. To determine the power delivered by a particular engine, the compressor rotor speed ($N_1$) may be measured, since rotor speed and horsepower are related. In addition, the horsepower delivered is also a function of the air temperature, the density and mass flow of the air decreasing with an increase in temperature.

The fuel control system to be described regulates the horsepower delivery by a gas turbine engine by varying the compressor rotor speed as a function of compressor inlet temperature in accordance with a preselected schedule. The schedule will vary with different engines, but the shape of the curve remains nearly constant. In addition, the fuel control of this invention will also limit turbine inlet temperature as a function of compressor inlet temperature, thereby preventing excessive temperatures in the turbine when the outside or ambient temperature increases.

It is therefore an object of this invention to provide, in a fuel control system, electronic circuit apparatus for changing the compressor rotor speed of a gas turbine engine as a function of compressor inlet temperature to provide constant horsepower over one temperature range and turbine inlet temperature limiting over another temperature range.

Another object of this invention is a novel electronic circuit which utilizes the compressor inlet temperature of a gas turbine engine to thereby regulate the fuel flow to the engine and produce a constant horsepower.

A further object of this invention is a novel electronic circuit for use in a fuel control system for gas turbine engines which regulates the compressor control speed of the engine as a function of compressor inlet temperature.

Another object of this invention is a novel electronic circuit for use in gas turbine engine fuel controls which varies the control speed of the compressor rotor by varying the resonant frequency of a control circuit.

A further object of this invention is a novel electronic circuit for use in gas turbine engine fuel controls which utilizes only D.C. components, thereby providing a significant reduction in the number of components, eliminating the use of transformers and providing a circuit which is more accurate and more versatile than other circuits known in the art.

These and other objects of this invention may be understood by referring to the following description and claims, read in conjunction with the accompanying drawings, in which:

FIGURE 1 shows schematically the electronic circuit of this invention; and

FIGURE 2 shows graphically the schedule to which the circuit of FIGURE 1 controls the engine; and FIGURE 3 shows a modification of the circuit of FIGURE 1; and FIGURE 4 is a graph of the schedule to which the circuit of FIGURE 3 controls the engine; and FIGURE 5 is a block diagram of a simplified fuel control system in which the circuits of FIGURES 1 and 3 may be used.

Referring initially to FIGURE 5, fuel control valve 10 is connected in the fuel line to thereby regulate the fuel flow from the fuel supply to the gas turbine engine. The position of fuel control valve 10 is regulated in response to a control signal, to be described, which is amplified by the servo amplifier 12 to thereby drive a servo-motor 14. Motor 14, which is reversible, drives the fuel control valve 10 through an actuator 16. Stabilization of the loop is provided by feedback in response to movement of actuator 16 through rate feedback circuit 18.

The control signal to the fuel control valve is provided by $N_1$ pulse pickup 20, which is connected in the engine to sense the speed of the compressor rotor ($N_1$). This may be done by means of an electromagnetic pickup positioned adjacent the rotor, the passage of each tooth in the rotor producing a pulse in the pickup. A compressor rotor speed set circuit 22, which may be a throttle connection or manual adjustment, produces a control or datum signal which is fed to $N_1$ speed control circuit 24. The speed control circuit 24 in essence compares the actual compressor rotor speed as sensed by pulse pickup 20 with the control speed indicated by speed set circuit 22. Any difference between the two signals produces an error signal which is fed to servo amplifier 12. The error signal produced by the $N_1$ speed control circuit 24 may be modified as a function of temperature. Specifically, the compressor control speed set by the $N_1$ speed set 22 is varied upward or downward as a function of ambient or compressor inlet temperature. The reason for this is that the density and mass flow of the air, and consequently the amount of thrust developed by a particular compressor rotor speed, is a function of temperature. Consequently, a temperature sensitive resistor such as the $T_T2$ thermistor shown in block 26 is placed in the compressor rotor inlet. Temperature variations sensed by the thermistor are conducted to $T_T2$ bias control circuit 28, where a signal is generated to bias the speed set as applied to the speed control circuit 24 thereby regulating the rotor speed and error signal as a function of temperature.

Referring now to FIGURE 1, the $T_T2$ bias control circuit 28 of FIGURE 5 is shown. Essentially, the inductance of an inductor L1 is varied as a function of temperature to thereby produce changes in the $N_1$ speed control circuit 24 of FIGURE 5. The inductor L1 is part of a resonant circuit within the $N_1$ speed control circuit. The $N_1$ speed control circuit 24 is shown and claimed in copending application Ser. No. 54,073, entitled, "Speed Responsive Control System," filed Sept. 6, 1960, by Henry E. Martin and assigned to the assignee of this application which has issued as Patent No. 3,119,055. In the $N_1$ speed control circuit, an LC resonant circuit is tuned by speed set circuit 22 of FIGURE 5 to resonate at a particular frequency, the frequency being a particular speed of the engine rotor. The resonant frequency is selected by adjusting the capacitance of the circuit. Any deviation in the actual compressor rotor speed from this resonant value produces a phase shift in the speed signal, and the amount of phase shift determines the error signal which is amplified and fed to a servomotor to control the fuel valve 10. The inductane L1, which is in fact an "Increductor," is also the inductor (reference numeral 80 in U.S. Patent 3,119,055) which forms a portion of the resonant circuit.

In FIGURE 1, a source of direct current B+ passes a current which flows through resistor R1 and Zener diode ZD₁. Diode ZD₁ is always operated in its Zener breakdown region, and consequently supplies a regulated source of D.C. voltage, of approximately 12 volts, to the circuit. Current from the regulated source is passed through rheostat R₂, resistor R3, another rheostat R5, inductance L1, and the parallel path including resistors R6 and RT₁ to the collector junction of transistor Q₁. The transistor Q₁ is an npn transistor having its emitter grounded. Resistor RT₁ is a negative temperature coefficient thermistor, that is, the resistance of RT₁ decreases with an increase in temperature. In parallel across rheostat R5 and inductor L1 is a path which includes a resistor R4 and a diode CR1. Transistor Q1 is normally operated in its saturated region because of a D.C. base voltage produced by voltage divider network R7, R8, R9, R10, R11, and RT₂. RT₂ is another negative temperature coefficient thermistor similar to resistor RT1. The voltage drop from the regulated voltage source across resistor R7 produces the positive base voltage which is fed to the base junction of transistor Q1 through base current limiting resistor R13. Rheostat R12 and resistor R14 provide feedback around transistor Q1 when transistor Q1 turns off, and this operation will be described in detail later.

The theory of operation of the circuit of FIGURE 1 is that the current flow through the inductor L1 is varied to correspond with the curve of FIGURE 2. The change in current through inductor L1 will change the inductance of L1, and consequently the resonant frequency of the speed control circuit 24. The curve is followed as a result of the change in resistance of thermistors RT1 and RT2 as a function of temperature, and in addition because of the novel circuit arrangement as will be described.

Initially, transistor Q1 is turned on and saturated because of the high positive base voltage produced from the reference voltage source at point A. Transistor current then flows from the regulated D.C. source through resistor R2, resistor R3, resistor R5, inductor L1 and through the parallel path of resistors R6 and RT1 through the collector to emitter path of transistor Q1. Thermistors RT1 and RT2 are inserted in the compressor inlet of the engine and respond to the compressor inlet temperature. Compressor inlet temperature is a direct function of ambient air temperature, and this temperature is used as an indication of air density, the air density varying with temperature. To obtain a given horsepower or thrust from the engine, the compressor rotor speed must be increased as the temperature increases to obtain the same mass air flow.

Since thermistor RT1 responds to compressor inlet temperature, and is a negative temperature coefficient resistor, the resistance of thermistor RT1 will decrease as the temperature increases. As the resistance of thermistor RT1 decreases, the resistance of the parallel pair of resistors R6 and RT1 will also decrease. Since the D.C. supply voltage remains constant, the total current flow through the path R2, R3, R5, L1, and the R6–RT1 parallel combination, will increase. An increase in current through inductor L1 will decrease the inductance, and a decrease in inductance will increase the resonant frequency of the N₁ speed control circuit 24. An increase in the resonant frequency will result in an increase in the speed error and tend to increase the rotor speed.

FIGURE 2 shows a plot of N1 control speed versus compressor inlet temperature. The thermistor resistance is also shown, since the thermistor resistance changes directly with compressor inlet temperature. Referring to the curve of FIGURE 2, the change in inductance as a function of a decrease in the resistance of thermistor RT1 and consequently an increase of current through inductor L1 is shown by the straight line portion of the curve, between points 1 and 2 of the curve. It should be noted that the N1 compressor speed which is varied as a function of compressor inlet temperature is shown as a delta change in N1 speed and not as a pure N1 speed. This variation from the normal operating speed $\Delta N_1$ changes slightly as a function of preselected $N_1$ speed. The portion of the curve of FIGURE 2 between points 1 and 2 is a constant horsepower curve. The fuel control will automatically maintain a constant horsepower at the preselected N1 speed by varying the N1 speed as a function of compressor inlet temperature as shown in FIGURE 2. For example, if the preselected N1 speed is 10,000 r.p.m., and the ambient or compressor inlet temperature is approximately −20° F., the circuit of this invention will decrease the control speed to 9,800 r.p.m. The reason for this is that the air is more dense at the low temperature of −20° F., and with the increased air density, a lower rotor speed will supply a constant horsepower. As the compressor inlet air temperature increases to approximately 20° F., the N1 control speed will be 9,950 r.p.m.

The portion of the curve between points 2 and 3 defines the NEMA standard horsepower relationship. The curve is essentially flat between points 2 and 3, and the exact shape of the curve and the temperatures for which this regulation is required will vary with different engines. The control of speed as shown between points 2 and 3 is obtained by keeping the current flow through inductor L1 fairly constant over this temperature range. This is accomplished by resistor R4 and diode CR1 of FIGURE 1. As the compressor inlet temperature increases, the thermistor resistance of RT1 will decrease continuously as shown in FIGURE 2. Eventually the point is reached where the voltage drop across rheostat R5 and inductance L1 is sufficient to overcome the constant potential of diode CR1. At this point, diode CR1 conducts, thereby bypassing some of the current around inductor L1. This occurs at a temperature of approximately 25° F. as shown in FIGURE 2. As the resistance of thermistor RT1 continues to decrease, the current flow from the regulated D.C. source through the transistor Q1 will continue to increase. However, the current through inductor L1 remains approximately constant because of the conduction of diode CR1. Resistor R4 limits the amount of current shunted around inductor L1 when CR1 conducts. Rheostat R5 is adjustable to thereby adjust the current level through inductor L1 at which the breakdown potential of diode CR1 is reached. Rheostat R5 will also adjust the angle or slope of the curve between points 2 and 3. Resistor R4, rheostat R5, thermistor RT1 and diode CR1 combine to provide the break at point 2 of the curve of FIGURE 2, and govern operation between points 2 and 3 of the curve.

As point 3 of the curve is approached, the resistance of thermistor RT2 is now decreased sufficiently for transistor Q1 to come out of saturation. As noted previously, the base voltage for transistor Q1 is provided by the voltage drop from the regulated D.C. source at point A. The voltage at point A is determined by the voltage divider network which includes resistors R7–R11 and thermistor RT2. R8–R11 also provide ambient temperature compensation for the circuit. As the resistance of R8–R11 decreases because of the decrease in resistance of thermistor RT2, the total impedance of the current path decreases. Consequently, the increase in current caused by the decrease in resistance will produce a higher voltage drop across resistor R7, and the base voltage directed to transistor Q1 will eventually approach ground. As the base voltage decreases, transistor Q1 will begin to come out of saturation. As this occurs, the current flow through the transistor will decrease, and the collector voltage of the transistor, which was at essentially ground voltage during saturation because of the low impedance of a saturated transistor, will begin to increase. This decrease in current flow through transistor Q1 will decrease the current flow through inductor L1. The decrease in current flow through inductor L1 will increase the inductance, and also decrease the resonant frequency of the N1 speed control circuit 24. The resulting decrease in N1 control speed with the further increase in temperature is shown between points 3 and 4 of FIGURE 2.

The necessity for the decrease in N1 control speed with an increase of compressor inlet temperature above approximately 80° F. is necessitated because of the increase in turbine inlet temperature which occurs with increased compressor inlet temperature. At very high ambient temperatures, the possibility of an excessive turbine inlet temperature is prevalent. To prevent excessively high turbine inlet temperatures, and the consequent damage to the turbine blades, it is necessary to cut back the N1 or compressor speed at these higher temperatures.

Rheostat R12 and resistor R14 produce a stabilizing feedback when transistor Q1 comes out of saturation. As the transistor comes out of saturation, the collector voltage begins to increase. This increase in voltage is fed from the collector junction through resistor R14 and rheostat R12 through resistor R13 to the base of the transistor. This positive voltage will tend to keep the transistor Q1 in saturation, and eliminate any sharp break in the curve. Rheostat R12 provides a gain trim for the Q1 transistor circuit as it comes out of saturation, and consequently provides trim between points 3 and 4 of the curve and also provides an adjustment of the break at point 3 of the curve.

FIGURE 3 is a simplified version of the circuit of FIGURE 1. It is essentially a portion of the circuitry of FIGURE 1 which may be used for other gas turbine engines not requiring the double break curve of FIGURE 2. FIGURE 4 shows the curve which will be produced by the circuit of FIGURE 3. The transistor is replaced in FIGURE 3 by resistor R7.

The circuit of FIGURE 3 operates essentially in the same manner as the circuit of FIGURE 1. As the resistance of thermistor RT1 decreases, the current flow between the regulated D.C. source through resistor R7 to ground will increase. This increase in current produces an increase in the inductance of inductor L1. As in FIGURE 1, the increased current eventually produces a sufficient voltage drop across rheostat R5 and inductor L1 to cause conduction of diode CR1. Any further increase in current because of a decrease in the resistance of RT1 will merely increase the current flow around inductor L1, and the current flow through inductor L1 will remain essentially constant. As in FIGURE 1, rheostat R2 and resistor R3 are current limiting resistors. R2 is also a gain adjustment for operation between points 1 and 2 of the curves.

Although the invention has been described in its preferred embodiment, it is apparent that changes and modifications may be made in the arrangement of components, and that numerous modifications may be made without departure from the scope of the invention as hereinafter claimed.

I claim:

1. An electronic circuit for varying the current flow through a load as a function of temperature in accordance with a preselected schedule comprising a source of regulated D.C. voltage, a transistor having a collector, a base, and emitter, a series circuit connected between said regulated voltage source and said transistor collector, said series circuit including a load and a first thermistor, means including a second thermistor connected to said voltage source for producing a biasing signal to the base of said transistor to thereby cause said transistor to saturate and produce a current flow through said load, means including said first thermistor responsive to temperature variations for causing an increase in current through said load when said temperature increases, a diode connected across said load, said diode conducting and bypassing excessive current around said load when the current flow through said load exceeds a predetermined magnitude, and means including said second thermistor responsive to a further increase in temperature for causing a decrease in the biasing signal to the base of said transistor to thereby lower the conduction of said transistor and decrease the current flow through said load.

2. An electronic circuit as in claim 1 and including a feedback circuit connected between the collector and base junctions of said transistor to prevent an instantaneous decrease in said load current when said transistor comes out of saturation.

3. In a fuel control system for a gas turbine engine having a compressor, the combination comprising,
 a source of D.C. voltage,
 a semiconductor having a control terminal and output terminals,
 a load circuit including a first temperature sensitive element, a control element, and said output terminals connected across said source,
 a bias circuit including a second temperature sensitive element connecting said source and said semiconductor control terminal to provide a bias to said semiconductor normally rendering said semiconductor conductive,
 said first element positioned to respond to the temperature of said compressor and producing an increase in current through said control element in response to increasing temperature,
 and said second element positioned to respond to the temperature of said compressor and varying the bias on said control terminal to reduce the conduction of said semiconductor in response to further temperature increases to thereby reduce the current through said control element.

4. A fuel control system as in claim 3 and further including means connected across said control element for bypassing excess current around said control element when the current flow through said control element exceeds a predetermined value.

5. A fuel control system as in claim 4 in which said means connected across said control element includes a resistor and diode in series.

6. A fuel control system as in claim 3 in which said first and second temperature sensitive elements are thermistors.

7. A fuel control system as in claim 3 in which said control element is an inductor, the magnitude of current flow through said inductor varying the inductance thereof.

8. A fuel control system as in claim 3 and including feedback means connected between the said control terminal and said output terminals to stabilize said semiconductor.

9. In a fuel control system for a gas turbine engine, the combination comprising
 a semiconductor having a control terminal and output terminals,
 a source of electrical power,
 a bias circuit connected between said source and said semiconductor control terminal to control the conduction of said semiconductor,
 a load circuit including a control element connected between said source and said semiconductor output terminals, said control element being responsive to the conduction of said semiconductor,
 a first circuit element responsive to a parameter of said engine connected in said load circuit to vary the response of said control element to the conduction of said semiconductor as a function of changes in said engine parameter,
 and a second circuit element responsive to said engine parameter connected in said bias circuit to vary the conduction of said semiconductor as a function of further changes in said engine parameter.

10. A fuel control system as in claim 9 wherein said first and second circuit elements are thermistors.

11. A fuel control system as in claim 10 in which said gas turbine engine includes a compressor, said thermistors being responsive to the temperature of said compressor.

(References on following page)

References Cited by the Examiner

UNITED STATES PATENTS

| | | |
|---|---|---|
| 2,720,751 | 10/1955 | Kunz. |
| 2,954,669 | 10/1960 | Williams. |
| 2,971,332 | 2/1961 | Lowrance _____ 60—39.14 |
| 2,971,337 | 2/1961 | Wintrode. |
| 2,991,405 | 7/1961 | Carlson. |
| 3,026,469 | 3/1962 | Wilbur et al. _____ 323—22 |
| 3,076,312 | 2/1963 | Haigh. |
| 3,098,356 | 7/1963 | Joline. |

JOHN F. COUCH, *Primary Examiner.*

MEYER PERLIN, *Examiner.*

R. A. DUA, W. E. RAY, W. M. SHOOP,
*Assistant Examiners.*